May 13, 1930.  J. R. SNYDER  1,758,090
SHOCK ABSORBER
Filed Aug. 29, 1925  3 Sheets-Sheet 1
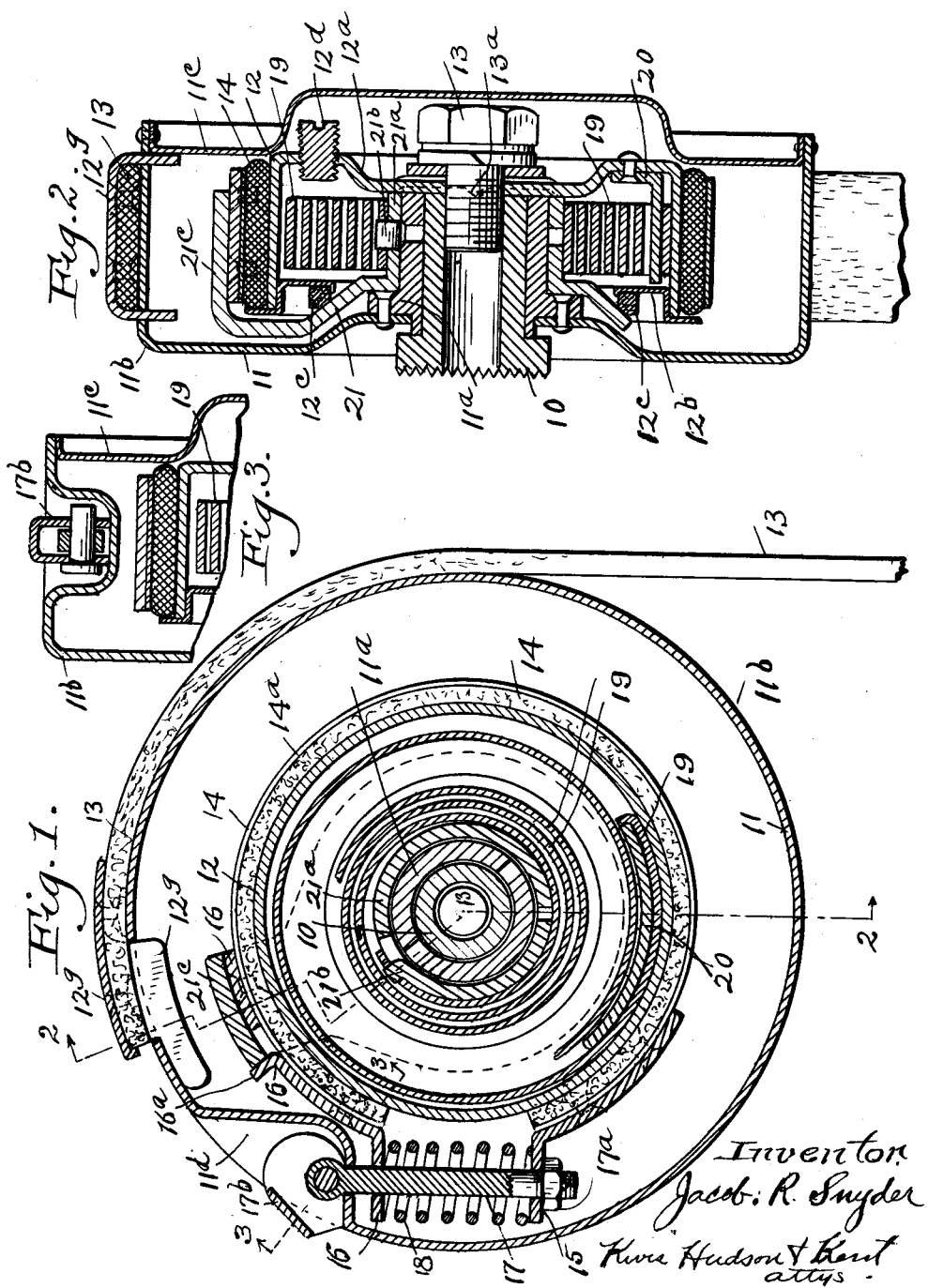

May 13, 1930.  J. R. SNYDER  1,758,090
SHOCK ABSORBER
Filed Aug. 29, 1925   3 Sheets-Sheet 2

Inventor
Jacob R. Snyder.

May 13, 1930. J. R. SNYDER 1,758,090
SHOCK ABSORBER
Filed Aug. 29, 1925 3 Sheets-Sheet 3

Inventor
Jacob. R. Snyder.
Kwis Hudson & Kent
attys

Patented May 13, 1930

1,758,090

UNITED STATES PATENT OFFICE

JACOB R. SNYDER, OF CLEVELAND, OHIO

SHOCK ABSORBER

Application filed August 29, 1925. Serial No. 53,276.

This invention relates to shock absorbers adapted particularly for motor vehicles and has for its chief object to provide an improved form of shock absorber which frictionally retards the rebound stroke while allowing the free compression stroke of the main springs.

A further object is to provide a shock absorber of this type, which while efficient and effective in action, is simple in construction, durable, inexpensive to manufacture, and readily adjusted.

A still further object is to accomplish the above with a construction wherein there is a dead or inactive portion of the stroke of limited extent, permitting minor vibrations without retardation, as when the car is running over a fairly smooth road.

All the above objects are accomplished very effectively by my invention, which may be here briefly summarized as consisting in certain novel details of construction, and combinations and arrangements of parts which will be described in the specification and set forth in the appended claims.

Figure 4:
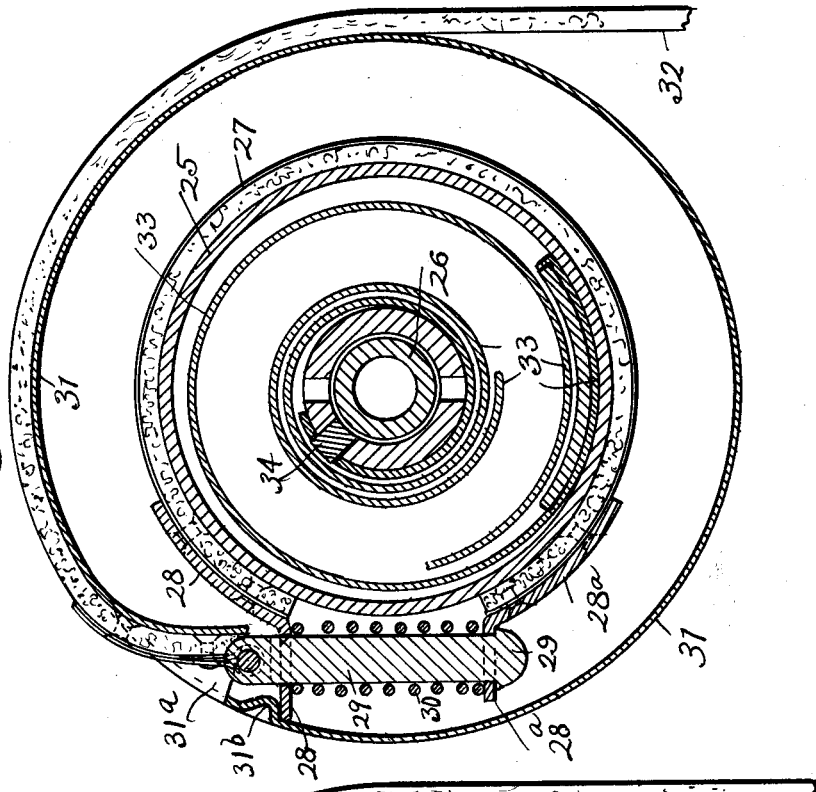
Figure 6:
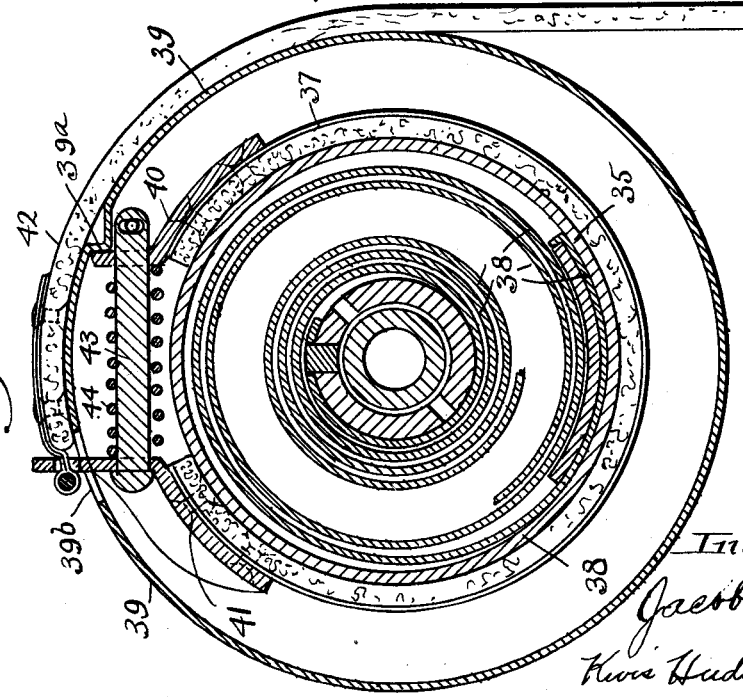
Figure 5:
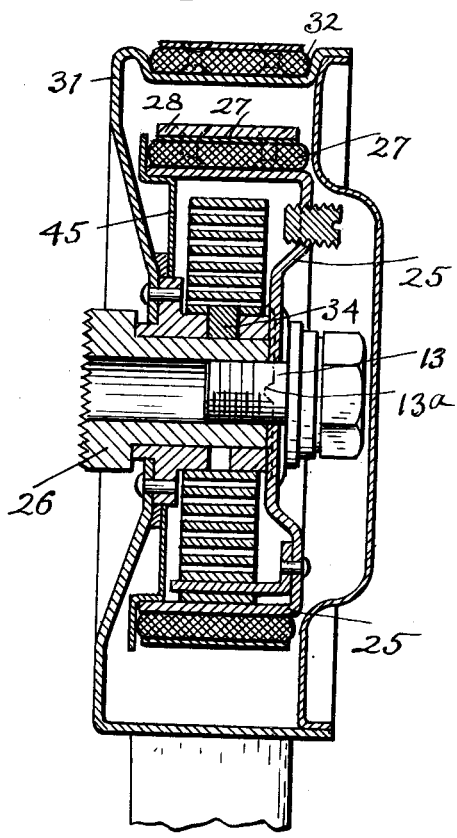
Figure 7:
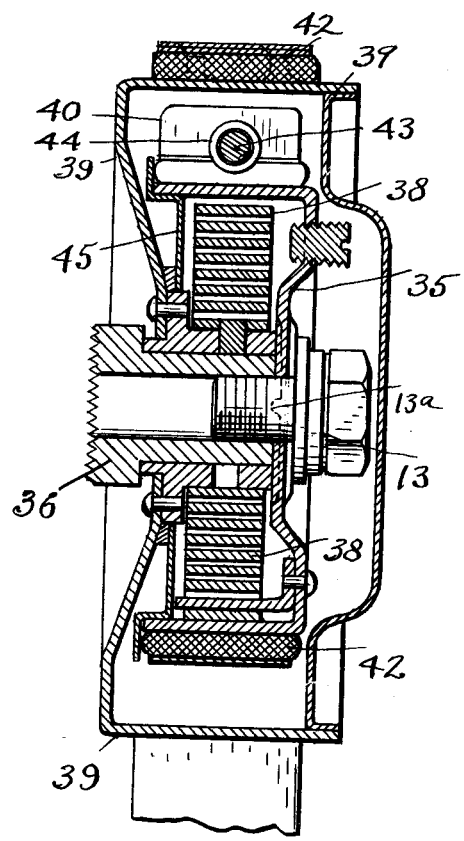

In the accompanying sheets of drawings, Fig. 1 is a transverse sectional view in the plane of the absorber showing the preferred construction; Fig. 2 is a section substantially along the irregular line 2—2 of Fig. 1, looking in the direction indicated by the arrows; Fig. 3 is a detail sectional view substantially along the line 3—3 of Fig. 1; Figs. 4 and 5 are views similar to Figs. 1 and 2, showing a modification; and Figs. 6 and 7 are similar views showing a still further modification.

Referring first to Figs. 1 and 2, 10 represents a stationary center member adapted to be secured, in this instance, to the chassis frame of the vehicle. Rotatable upon the center member 10 is a hollow drum 11, to which is attached by a clip 12$^g$, a strap 13, adapted to be secured to the axle of the motor vehicle, and adapted to be wound onto the drum during the compression stroke of the main springs during which time the friction members are inactive, and to be unwound from the drum during the rebound stroke, when the friction members are active to retard the action of the main springs.

The drum 11 is composed of a hub portion 11$^a$, adapted to turn on a reduced portion of the center member 10, and two sheet metal stampings 11$^b$ and 11$^c$, the former being a cup-shaped member secured to the hub portion 11$^a$ and forming one side and the periphery of the drum. The stamping 11$^c$ which forms merely a closure for the open end of the cup or stamping 11$^b$, can be secured to the latter in any suitable way.

Inside the rotatable drum 11 is a stationary drum 12, constituting one of the friction members, and formed chiefly by a stamping 12$^a$, having a peripheral portion adapted to be engaged by the companion friction member, and a side portion which is clamped to the end of the center member 10 by a bolt 13 which is screwed into one end of the center member, as clearly indicated in Fig. 2. Preferably the central part of the stamping and the end of the center-bolt are provided respectively with interfitting notches and ribs, indicated at 13$^a$ in Fig. 2, to provide an interlock, and also to permit an adjustment of the position of the drum and of the other parts associated therewith.

Surrounding the peripheral portion of the drum 12 is a second friction member consisting of a flexible friction band 14 which may, if desired, be covered with a strip of flexible metal 14$^a$. The band 14 is made out of suitable wear-resisting friction material, such, for example, as is commonly used for brake linings, or other material which will answer the purpose.

The friction band, which is adapted to be contracted against the stationary drum 12 to create the frictional resistance, and to be expanded to relieve the friction, has secured to its ends, clips 15 and 16 having outstanding ears, through which is extended a link 17, which is surrounded by a compression spring 18, the function of which is to open the band and to relieve the friction of the latter on the drum. One end of the link 17 is provided with an adjustable abutment which may be in the form of a nut 17$^a$, and the other end is suitably connected to the rotating drum 11, so that the drum when rotated in one direction will pull on the link and contract the band onto the periphery of the stationary drum 12 and rotate the band on the stationary member with the friction members active, and when moved in the other direction will allow the spring 18 to expand the band 14 so that the drum may turn the band freely on the stationary drum. In this instance the outer end of the link 17 extends through an opening in the base of a depressed or inset part 11ᵈ on the periphery of the drum, and attached to the outer end of the link is an eccentric abutment 17ᵇ, which normally occupies the position shown in Fig. 1, but which can be turned to draw up on the link to cause the band to tightly grip the stationary drum 12, as during shipment and before the shock absorber is installed on a car, during which time it is preferable that the spring be set up or tightened to the proper tension, and retained in that condition until the shock absorber is properly mounted on the car. By turning the eccentric abutment 17ᵇ in one direction, the band can be caused to so tightly grip the stationary drum as to prevent the unwinding of the main spring, and when turned to the position shown, the band is released, and may be expanded or contracted as the rotary drum is turned in opposite directions.

Inside the stationary drum 12 is a coiled spring 19 formed of flat material. One end of this spring is fixed, and in this instance it is the outer end which is fixed, this end being secured to the inner peripheral wall of the stationary drum 12 by having the end portion of its outer convolution passed between the peripheral part of the drum and a stationary spring support 20, and hooked over the end of the spring support, as indicated in Fig. 1. However, the spring might be secured to the drum in other ways. The spring support 20 may be secured to the side of the stationary drum as shown in the lower part of Fig. 2.

The inner end of the spring is secured to a rotatable member 21, this member having a sleeve or hub 21ᵃ, journaled on the hub 11ᵃ of the rotatable drum 11. The inner end of the spring is preferably attached to the hub or sleeve 21ᵃ of this rotatable member in any suitable way, as by being hooked over a lug 21ᵇ struck up from the sleeve 21ᵃ.

The rotatable member 21 which the spring 19 constantly tends to rotate in one direction, is provided with an arm 21ᶜ, which extends outwardly and then laterally, as indicated in Figs. 1 and 2, and overlies the clip 16, which is attached to one end of the friction band 14, as already described, and bears against an upstanding ear or lug 16ᵃ of said clip, as clearly shown in Fig. 1.

Before describing the operation of the shock absorber it may be stated that the spring 19 is preferably completely housed, the housing being formed by the stamping forming the stationary drum 12, and by a second stamping 12ᵇ, the latter preferably carrying a packing 12ᶜ, which engages the rotatable member 21, as indicated in Fig. 2. The space which receives or houses the spring 19 may be provided with lubricant, and the latter may be admitted through an opening normally closed by a plug 12ᵈ. Access can be had to this plug by removing the stamping 11ᶜ from the rotatable drum.

The operation of the shock absorber is as follows: During the compression stroke of the main springs of the vehicle, the spring 18 is free to expand and open up the friction band until the outstanding ear of clip 16 engages the base of the depression 11ᵈ. This relieves the friction on the stationary drum, and as soon as this occurs, the spring 19 acting through the rotatable member 21 actuates arm 21ᶜ, and through the engagement of the arm 21ᶜ with the abutment 16ᵃ of clip 16, freely rotates the friction band and rotatable drum 11, winding in the strap 13. During the rebound stroke of the main springs the strap is pulled out, rotating the drum 11 in the reverse direction. At the beginning of the rebound stroke, the pull on the strap transmitted to the drum and to the link 17, clamps the friction band onto the stationary drum, whereupon the drum 11 is rotated against the friction created by the pressure of the band 14 on the stationary drum 12. While the drum 11 is thus being rotated by the pull on the strap, the main spring 19 is wound up,—that is to say, its tension is increased by moving the arm 21ᶜ in a clockwise direction as the same is viewed in Fig. 1. At the end of the rebound stroke, the spring 18 is again permitted to expand so as to relieve the frictional grip between the band 14 and stationary drum 12, whereupon the spring again winds in the strap.

There is permitted a more or less free movement, represented by the distance between the outstanding ear of clip 16 and the base of the depression 11ᵈ, which can be made anything desirable. This distance represents a certain circumferential movement of the drum 11, and consequently, in and out movement of the strap when there is no frictional retardation, thus permitting free minor vibrations of the main springs without bringing into action the friction members of the shock absorber.

If it is desired to adjust the positions of the parts of the shock absorber, as when the body of the absorber must be so mounted with reference to the point of attachment of the strap with the axle that it becomes desirable to turn the entire mechanism, this can be done very readily by first removing the cover 11ᶜ, backing out the screw 13, and turning the stationary drum 12, which through the action of the spring 19 will revolve the entire device about the center member 10, and again tightening the screw 13 when the interlocking tongue and groove connection indicated at 13ª has again been established.

If it is desired simply to adjust the tension of the spring 19, this can be done in a similar manner, but by turning simply the drum 12 to which the spring 19 is attached, the other parts being held against rotation.

It might be noted also, that lubricant is retained in the spring housing formed within the stationary drum, so that the convolutions thereof will be well lubricated, preventing or minimizing noise, and furthermore, the lubricant supplied to the spring housing will find its way to lubricate the bearing surfaces between the bearings of the relatively rotating parts, including the stationary center member 10, the hub 11ª of the rotatable drum, and the hub 21ª of the rotatable member 21.

Substantially the same results are obtained with the construction illustrated in Figs. 4 to 7. However, in both these constructions the intermediate rotatable member 21 between the main spring and the rotatable drum is eliminated, the spring acting directly on the rotatable drum.

In the construction shown in Figs. 4 and 5, the stationary friction member, in the form of a drum 25, is secured to a stationary center member 26 in the same manner as before, the peripheral part of the drum 25 being engaged by an expansible friction member 27 similar to that first described, and provided with clips 28 and 28ª through which a link 29 passes, the latter being surrounded by a spring 30 which has the same function as the spring 18 of the construction first described, i. e. to expand the friction band 27 so as to allow the free rotation of the rotatable drum here designated 31, the latter having its hub portion journaled directly on the stationary center member 26. The strap here designated 32 is in this instance directly connected to one end of the link 29, the direct connection being made through an opening 31ª formed in the periphery of the drum, the drum being indented or inclined inwardly at or adjacent the opening 31ª, so that a clip on the end of the strap may be readily extended inwardly and attached to the adjacent end of link 29. The drum also has a second indentation indicated at 31ᵇ forming an interior shoulder which engages the outstanding ear of clip 28.

The main spring here designated 33 has its outer end connected as before to the peripheral portion of the stationary drum 25 and its inner end is connected by any suitable means such as by a pin 34, to the hub of the rotatable drum 31.

When the pull on the strap 32 is slackened as at the beginning of the compression stroke of the main springs of the vehicle, the spring 30 expands the band 27, relieving the friction and allowing the spring 33 to rotate the drum 31 so as to wind in the strap 32 and turn the band 27 freely on the stationary drum 25 through the engagement of the shoulder 31ᵇ with the end of clip 28.

During the rebound stroke, the first effect of the pull on the strap 32 is to contract the band on the stationary drum 25 so as to create the friction under which the rotatable drum is rotated and the strap pulled out during the major portion of the rebound stroke. At the end of the rebound stroke the slack in the strap 32 again allows the spring 30 to come into action and relieve the friction. With this construction there is a limited free in and out movement of the strap without the friction retardation.

The construction shown in Figs. 6 and 7 is quite similar to that last described, the stationary friction member or drum 35 being secured as before to the stationary center member 36, the periphery of the stationary drum being engaged by an expansible and rotatable friction member 37, and the main spring 38 having its outer end connected to the stationary drum and its inner end connected to the hub of the rotatable drum 39 precisely as in the construction of Figs. 4 and 5. In this instance the rotatable drum 39 has an indentation 39ª forming a shoulder engaged by a clip 40 attached to one end of the expansible friction member 37. It also has an opening 39ᵇ in its periphery, and the end of clip 41 attached to the opposite end of expansible friction member 37 is extended through this opening, and the strap 42 is attached to the outer end of clip 41. The ends of clips 40 and 41 are as before joined by a link 43 surrounded by a spring 44 which is adapted to expand the friction member 37 and relieve the friction.

When the pull on strap 42 is slackened, spring 44 is permitted to expand the friction member 37, the slot or opening 39ᵇ in the drum permitting the necessary relative movement between the outer end of clip 41 and the drum, and as soon as the friction is relieved, the main spring 38 rotates the drum so as to wind in the strap and to turn the friction member 37 on the stationary friction member or drum 35, the action of spring 38 being transmitted from the rotatable drum 39 through shoulder 39ª to clip 40 and hence to the friction member 37, which now is in expanded state. When the slack in the strap is relieved and the rebound stroke of the main springs of the vehicle occurs, the first effect of the pull on strap 42 is to contract the friction member 37 onto the drum, and then to rotate the drum and to slide the friction member 37 around the stationary drum 35.

In the constructions illustrated in Figs. 4 and 5 and 6 to 7, the main spring is completely housed by the stamping forming the stationary drum or friction member and by an auxiliary stamping 45, and lubricant may be supplied to lubricate the spring as before. Likewise the adjustments may be made as with the construction first described. Additionally the abutments at the inner ends of links 29 and 43 may be made adjustable as in the construction illustrated in Figs. 1 to 3.

Thus it will be seen that I have provided a shock absorber which does not require an outside stationary casing to enclose the active parts and wherein there are relatively movable friction members effective during the rebound stroke only, the friction being automatically relieved by spring action as by a relatively small auxiliary spring, independently of any force exerted by the main spring or strap.

Having described my invention, I claim:

1. In a shock absorber for a vehicle having main springs, a pair of friction members one movable about the axis of the other, said movable member being adapted to move in one direction during the compression stroke of the main springs and adapted to move in the opposite direction during the rebound stroke of the main springs, means for moving one of said members in one direction relatively to the other and at the same time causing said members to be held in frictional engagement during the rebound stroke of the main springs, and independent means acting upon said movable member to thereby relieve the friction during the compression stroke of the main springs.

2. In a shock absorber for a vehicle having main springs, a pair of friction members movable relatively in one direction during the compression stroke of the main springs and movable relatively in the opposite direction during the rebound stroke of the main springs, said members including a flexible member adapted to be pressed into engagement with the other to create frictional resistance and to be released therefrom, means for causing frictional engagement during the rebound stroke of the main springs, and means acting upon said flexible member to thereby relieve the friction during the compression stroke of the main springs.

3. In a shock absorber, a pair of relatively movable friction members, means for moving one of said members in one direction relatively to the other and at the same time causing frictional engagement therebetween, a spring for causing relative movement between said members in the reverse direction, and spring means acting upon the ends of one of said friction members to thereby relieve the friction during the last mentioned relative movement.

4. In a shock absorber, a rotary member, a strap adapted to be wound onto and unwound from the rotary member, a spring for rotating said member in one direction, a pair of relatively movable friction members adapted to frictionally retard the movement of said rotary member in one direction and including an expansible friction member which is spring released from the other member when said rotary member is rotated by said spring.

5. In a shock absorber, a rotary member, a strap adapted to be wound onto and unwound from the rotary member, a spring for rotating said member in one direction, a pair of relatively movable friction members adapted to frictionally retard the movement of said rotary member in one direction and including an expansible friction member and a spring independent of the first-named spring for acting on said flexible friction member to relieve the friction when said rotary member is rotated by the first-named spring.

6. In a shock absorber, a rotary drum, a strap connected thereto, a spring for rotating the drum in one direction to wind in the strap, a pair of friction members, one stationary and the other rotatable, and a spring acting on one of said friction members to automatically relieve the friction when the drum is rotated in a direction to wind in the strap.

7. In a shock absorber, a rotary drum having a strap connected thereto, a spring for rotating the drum in one direction to wind in the strap, a stationary friction member, a flexible and expansible friction member engaging the stationary friction member, and a spring acting on said flexible friction member to automatically relieve the friction when the drum is rotated by the first mentioned spring to wind in the strap.

In testimony whereof, I hereunto affix my signature.

JACOB R. SNYDER.